United States Patent

Knop, Jr.

Patent Number: 5,194,049
Date of Patent: Mar. 16, 1993

[54] COMBINED DIRECTIONAL AND INFINITELY VARIABLE-SPEED TRANSMISSION

[76] Inventor: Fred L. Knop, Jr., 124 E. Oakwood Rd., East Peoria, Ill. 61611

[21] Appl. No.: 826,097

[22] Filed: Jan. 27, 1992

[51] Int. Cl.⁵ .............................................. F16H 7/00
[52] U.S. Cl. ...................................... 474/69; 474/18
[58] Field of Search ................. 474/8, 11, 12, 17, 28, 474/69, 70, 148

[56] References Cited

U.S. PATENT DOCUMENTS

| | | | |
|---|---|---|---|
| 4,740,191 | 4/1988 | Takano et al. | 474/69 |
| 4,913,686 | 4/1990 | Hattori | 474/18 X |
| 5,031,481 | 7/1991 | Algrain et al. | 474/8 X |

*Primary Examiner*—Thuy M. Bui

[57] ABSTRACT

The present invention relates to a combined directional and infinitely variable speed transmission which, through a single continuous V-belt pulley drive mechanism, is capable of infinitely variable changing speeds and direction with a single control. It employs an axially adjustable non-rotatable drive inducing input pulley whose effective operaing diameter can be adjusted to vary its dimentional ratio with a rotatable, fixed diameter orbiting output pulley rotatable driven on its own axis by a walking motion of the connecting V-belt about the non-rotatable input pulley. Prior art transmission all require some type of forward-reverse directional change mechanism completely separate and apart from the speed section of the transmission. The present invention eliminates such separate directional devices by being able to manipulate the ratio between the effective operating diameters of the pulleys to change direction at the same time that such ratio is determining the output speed of the transmission. This is due to the fact that the walking movement (emphasis added) of the belt around the stationary input pulley will rotate the output pulley in either direction depending on the effective relative operating diameters of the pulleys. Where their diameters are equal, no drive is transmtted. However, on either side of this "neutral" position, one pulley's effective operating diameter is different from the other, causing speed as well as directional changes from the drive train, even though the belt is always walking around the "drive inducing" input pulley in the same direction.

6 Claims, 2 Drawing Sheets

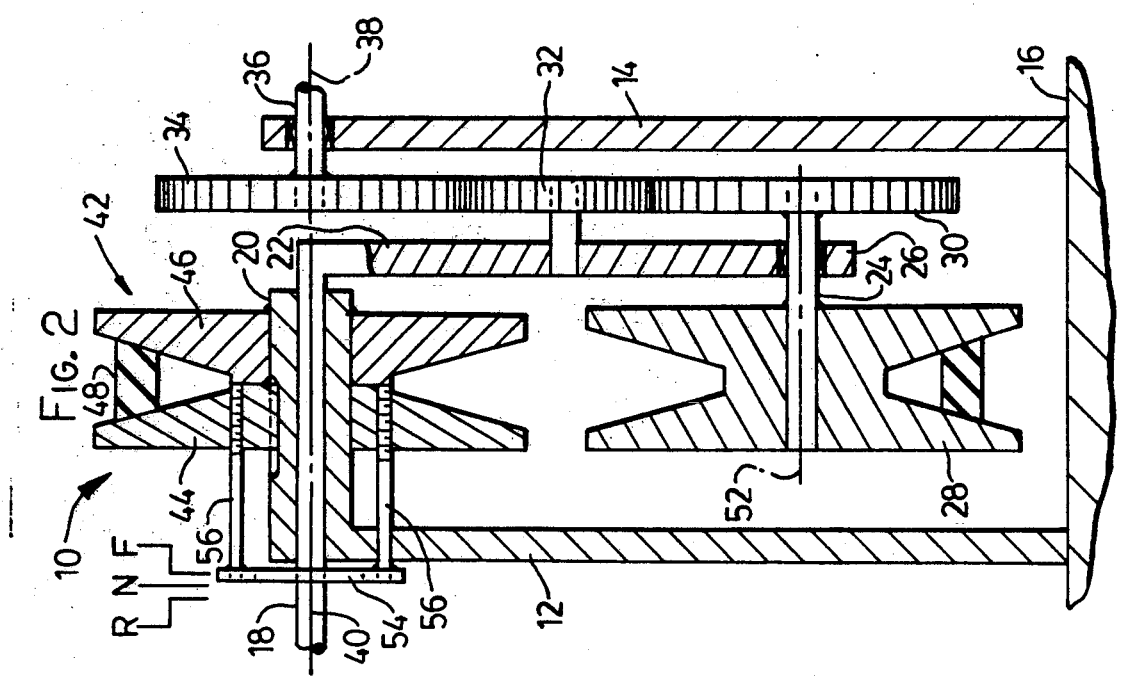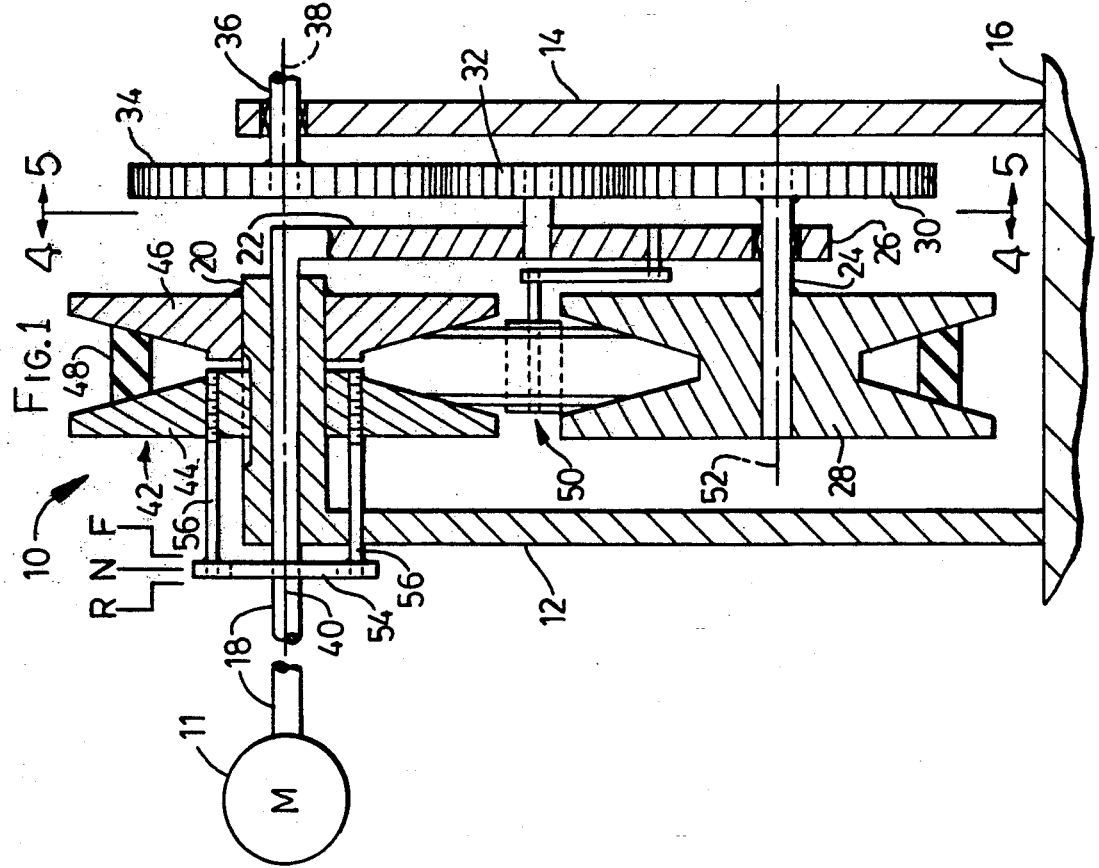

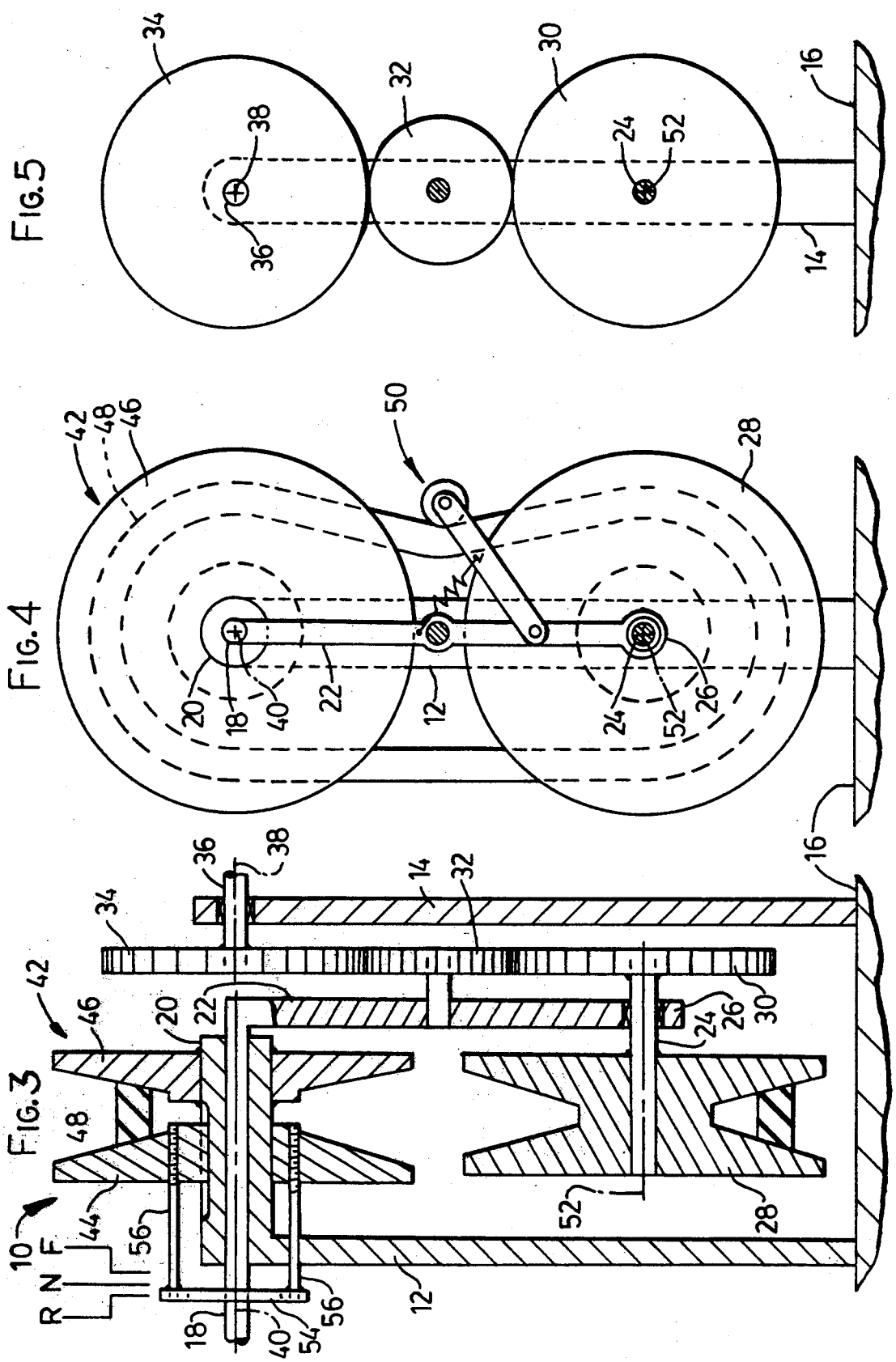

COMBINED DIRECTIONAL AND INFINITELY VARIABLE-SPEED TRANSMISSION

DESCRIPTION

1. Technical Field

The present invention relates to a combined directional and infinitely variable speed transmission for transmitting a relatively smooth flow of driving power between an inlet power source and one or a multiplicity of driven output members; and more particularly to such a transmission which provides such a full range of multidirectional rotational speeds from a single unidirectional power source without the need for a separate reversing mechanism at the power source or within the variable speed mechanism of the transmission.

2. Background Art

Heretofore, in any type of power transmitting device, whether geared or belted, it was necessary to provide some type of forward-reverse change mechanism. Such mechanism was completely separate from the speed change section of the transmission, adding greatly to the bulk and weight and further complicating the controls necessary to operate these separate units. For example, in automobiles a separate reverse gear, or gear train, is provided which usually has but a single low speed gear. Other vehicles, such as heavy earthmoving equipment, provide multiple reverse working speeds, but again, this is only achieved through a reverse gear box completely separated from the forward drive section. This is also true of planetary units requiring separate reverse gear planetary sets which only utilize the output gear portions of the forward planetary sets to connect the reverse planetary with the output. Again, the forward speed gear trains have no speed-changing effect on the reverse speed operation of the transmission. It is therefore recognized that an improved combined directional and infinitely variable speed transmission is desirable which is adapted to be operated with a single relatively simple control mechanism for achieving both forward and reverse operation, with each direction providing the same full range of infinitely variable operating speeds. Accordingly, the present invention is directed to overcoming the problems as set forth above.

DISCLOSURE OF THE INVENTION

In accordance with one aspect of the present invention, there is provided a combined directional and infinitely variable-speed transmission which has a unidirectional input rotatable through a first non-rotable radially adjustable pulley which has a crank arm rotatably supporting a second pulley for orbiting movement around the first pulley with the pulleys being interconnected by an endless V-belt trained thereabout for walking movement around the first pulley in driving relation to the second pulley at a speed and direction corresponding to the ratio of the effective operating diameters of the pulleys.

BRIEF DESCRIPTION OF THE DRAWINGS

FIG. 1 is a diagramatic elevational view of the combined directional and infinitely variable-speed transmission of the present invention shown in a neutral position.

FIG. 2 is a diagramatic elevational view similar to FIG. 1 but showing the transmission of the present invention in a forward operating position.

FIG. 3 is a view similar to FIG. 2 but showing the transmission in a reverse operating position.

FIG. 4 is a diagramatic sectional view through the transmission of the present invention taken along a plane and looking in the direction of the arrows on line 4—4 of FIG. 1.

FIG. 5 is a diagramatic sectional view through the transmission taken along the plane and looking in the direction of the arrows on line 5—5 of FIG. 1.

BEST MODE FOR CARRYING OUT THE INVENTION

Referring more particularly to FIG. 1 of the drawings, a combined directional and infinitely variable-speed transmission embodying the principles of the present invention is generally designated by the reference numeral 10. The power transmitting device 10 is capable of providing a variable, reversible output from a constant unidirectional power input motor 11. The device 10 is supported by members 12 and 14, which are secured to a suitable base means 16. An input power shaft 18 is extended from the motor 11 and is rotatably mounted in a fixed member 20, secured to support member 12. Input shaft 18 is secured to a crank arm 22. A rotatable countershaft 24 is carried in the distal end 26 of arm 22. A V-pulley 28 is secured to one end of shaft 24 and a transfer gear 30 is secured to the other end of shaft 24. The gear 30 mates with an idler gear 32 which, in turn, mates with an output gear 34. The gear 34 is secured to an output shaft 36 which is rotatably mounted in support member 14. It should be noted that the axial center line 38 of output shaft 36 is co-incident with the axis center line 40 of input shaft 18. A non-rotatable, variable diameter pulley 42 comprising pulley halves 44 and 46 is mounted on fixed member 20. A V-belt 48 connects pulley 42 with the pulley 28 for purposes hereinafter described. A belt tensioner means 50 is provided to maintain proper tension on the belt 48 at all times.

INDUSTRIAL APPLICABILITY

For purposes of this description assume the following conditions; an input speed of 1 rpm in the clockwise direction when viewed from the input side of device 10; diameter of pulley 28=3 inches; diameter of gears 30 and 34=3 inches; and the effective diameter of pulley 42 is variable between 2.5 and 4.0 inches, but as shown in FIG. 1 is set to be 3 inches.

Rotation of the input shaft 18 will cause arm 22 to rotate about the centerline 40 such that pulley 28 will orbit pulley 42 and gear 30 will orbit about gear 34. Since a belt 48 engages the pulleys 28 and 42, and because pulley 42 is non-rotatably fixed to member 20, pulley 28 will rotate about its axis centerline 52 on shaft 24 when the arm 22 is rotated about the centerline 40. Since gear 30 is also fixed to shaft 24, it will also rotate about the centerline 52. Since the gear 30 is meshed with gear 34 through the idler gear 32, gear 34 and shaft 38 to which the gear 34 is secured, will be rotated about the centerline 38 in the following manner. As arm 22 is rotated clockwise about centerline 40, the belt 48 will cause pulley 28 to rotate counterclockwise about centerline 52, which will cause gear 34, through idler gear 32, to rotate counterclockwise about centerline 38. However, the planetary orbit of pulley 28 and gear 30 about centerline 40 will cause gear 34 to also rotate clockwise about centerline 38. As shown on FIG. 1, for the conditions assumed, output shaft 36 rotation will actually be equal to 0 or a neutral drive position.

Looking now at FIG. 2, and assuming the conditions shown; that is, the effective diameter of pulley 42 has been changed to 4 inches by the control means 54 and the control rods 56. With these values, the output is 0.3 rpm rotation in the clockwise direction when the input is 1 rpm in the clockwise direction.

As shown on FIG. 3, if the effective diameter of pulley 42 is changed to 2.5 inches by the control means 54, then the output will be 0.17 rpm in the counterclockwise direction.

It can be said then, that whenever the variable diameter of pulley 42 is larger than the diameter of pulley 28, output rotation will be in the clockwise direction. Conversely, when the variable diameter of pulley 42 is smaller than the diameter of pulley 28, output rotation will be in the counterclockwise direction. And, if the diameters of pulleys 28 and 42 are the same, there will be no output rotation. Consequently, this device can be shifted from some predetermined clockwise or forward output rotation, through a zero or neutral output to some predetermined counterclockwise or reverse output rotation, or vice-versa, without the need for a reversing mechanism or to stop and change input rotation.

As best shown in FIG. 4, pulley 28 is carried by arm 22 about the centerline 40 in an orbital manner and also rotates about the centerline 52 as described. Also shown is the tensioner device 50 required to maintain belt tension as the effective diameter of pulley 42 is changed.

FIG. 5 depicts the relationship of gear 30 as it is carried around gear 34 in an orbital manner about the centerline 38. Gear 30 will also rotate about the centerline 52, as described.

From the foregoing it is readily apparent that the present invention provides a combined directional and infinitely variable speed transmission having a driving shaft 18 and a driven shaft 36 positioned in coaxial alignment and a countershaft 24 arranged to orbitally encircle the driving and driven shafts. A non-rotatable variable diameter pulley 42 is mounted such that its axis is coincident with the axis of rotation of said driving shaft, a rotatable V-pulley 28 is mounted on said countershaft, a V-belt 48 is trained over said pulleys, a gear 30 is mounted on and secured to said countershaft, said gear being in mesh with an idler gear 32, said idler gear in mesh with an output gear 34 carried on and secured to said driven shaft to cause rotation thereof in response to a ratio of the variable diameter pulley to the diameter of the rotatable V-pulley, and wherein if the ratio is greater than one, rotation of the driven shaft will be in one direction, and wherein if the ratio is less than one, rotation will be in the opposite direction, but if the ratio is equal to one, no rotation of the driven shaft will occur, said ratio being infinitely and continuously changed to control direction of rotation of the driven shaft from a predetermined maximum speed in one direction, through zero rotation to a predetermined maximum speed in the opposite direction without the need for a reversing mechanism or the need to change direction of rotation of the driving shaft.

I claim:

1. A combined directional and infinitely variable speed transmission comprising;
    a stationary first V-belt pulley;
    an input drive shaft rotatably, coaxially extended through said first pulley and having an elongated crank arm radially extended therefrom;
    a second V-belt pulley freely rotatably mounted on said crank arm for orbiting movement about said first pulley; and
    an endless V-belt trained around said first and second pulleys in interconnecting driving relation therebetween as the V-belt is walked around said stationary first pulley to cause positive driven rotation of said second pulley.

2. The transmission of claim 1 in which said first pulley has a pair of opposing axially shiftable halves for infinitely variably adjusting its effective diameter; and
    tensioning means operationally engagable with said V-belt to maintain belt tension between the pulleys during said adjustment of said first pulley.

3. The transmission of claim 2 including control means for axially shifting one of said pulley halves toward and from the other between opposite maximum and minimum diameter positions.

4. The transmission of claim 3 wherein said maximum diameter position of said first pulley is greater than the diameter of said second pulley to cause rotation of the second pulley in a predetermined direction;
    said minimum diameter position is less than the diameter of said second pulley to cause rotation of the second pulley in an opposite direction to its direction of rotation in the maximum diameter position; and
    a third neutral position approximately midway between said maximum and minimum diameter positions when the effective diameter of said first pulley is substantially equal to the diameter of the second pulley.

5. The transmission of claim 4 in which said tensioning means includes a spring biased roller arm that is pivotally mounted on said crank arm between said first and second pulleys.

6. The transmission of claim 5 further including a countershaft axially extending from said second pulley;
    journal means on said crank arm rotatably mounting said countershaft in spaced substantially parallel relation to said input drive shaft;
    a drive transfer gear mounted on said countershaft;
    an idler gear rotatably mounted on said crank arm radially inwardly of said countershaft in meshing relation with said transfer gear; and
    an output gear disposed in meshing relation with said idler gear and having a rotational axis substantially aligned with said input drive shaft.

* * * * *